United States Patent [19]

Klass

[11] 4,171,017

[45] Oct. 16, 1979

[54] METHOD OF GAS PRODUCTION FROM GEOPRESSURIZED GEOTHERMAL BRINES

[75] Inventor: Donald L. Klass, Barrington, Ill.

[73] Assignee: Institute of Gas Technology, Chicago, Ill.

[21] Appl. No.: 891,507

[22] Filed: Mar. 30, 1978

[51] Int. Cl.² .................... B01D 53/22; E21B 39/00; E21B 43/00

[52] U.S. Cl. .................... 166/266; 166/267; 55/16; 55/158

[58] Field of Search ............... 166/265–267, 166/75 R; 55/16, 55, 158; 165/45

[56] References Cited

U.S. PATENT DOCUMENTS

| | | | |
|---|---|---|---|
| 2,517,198 | 8/1950 | Gilbert | 166/105.5 |
| 3,335,545 | 8/1967 | Robb et al. | 55/158 X |
| 3,369,343 | 2/1968 | Robb | 55/158 X |
| 3,534,528 | 10/1970 | Porter | 55/16 |
| 3,629,075 | 12/1971 | Gutbier | 55/16 X |
| 3,797,200 | 3/1974 | Klass et al. | 55/16 |
| 3,893,299 | 7/1975 | Hutchinson et al. | 165/45 X |
| 4,059,156 | 11/1977 | Berg | 165/45 X |
| 4,082,140 | 4/1978 | Erwin | 165/45 |
| 4,089,175 | 5/1978 | Woinsky | 165/45 X |

Primary Examiner—Stephen J. Novosad
Attorney, Agent, or Firm—Jakala, Knechtel, Valentino, Demeur & Dallas

[57] ABSTRACT

In accordance with the method of the present invention, methane and other similar fuel components are separated from the brine found in geopressurized geothermal zones by immersing gas permeable membranes selective for these fuel components into the brine in these zones, and permitting these fuel components to permeate through the membranes while rejecting the brine. The permeated fuel components then are collected.

13 Claims, 5 Drawing Figures

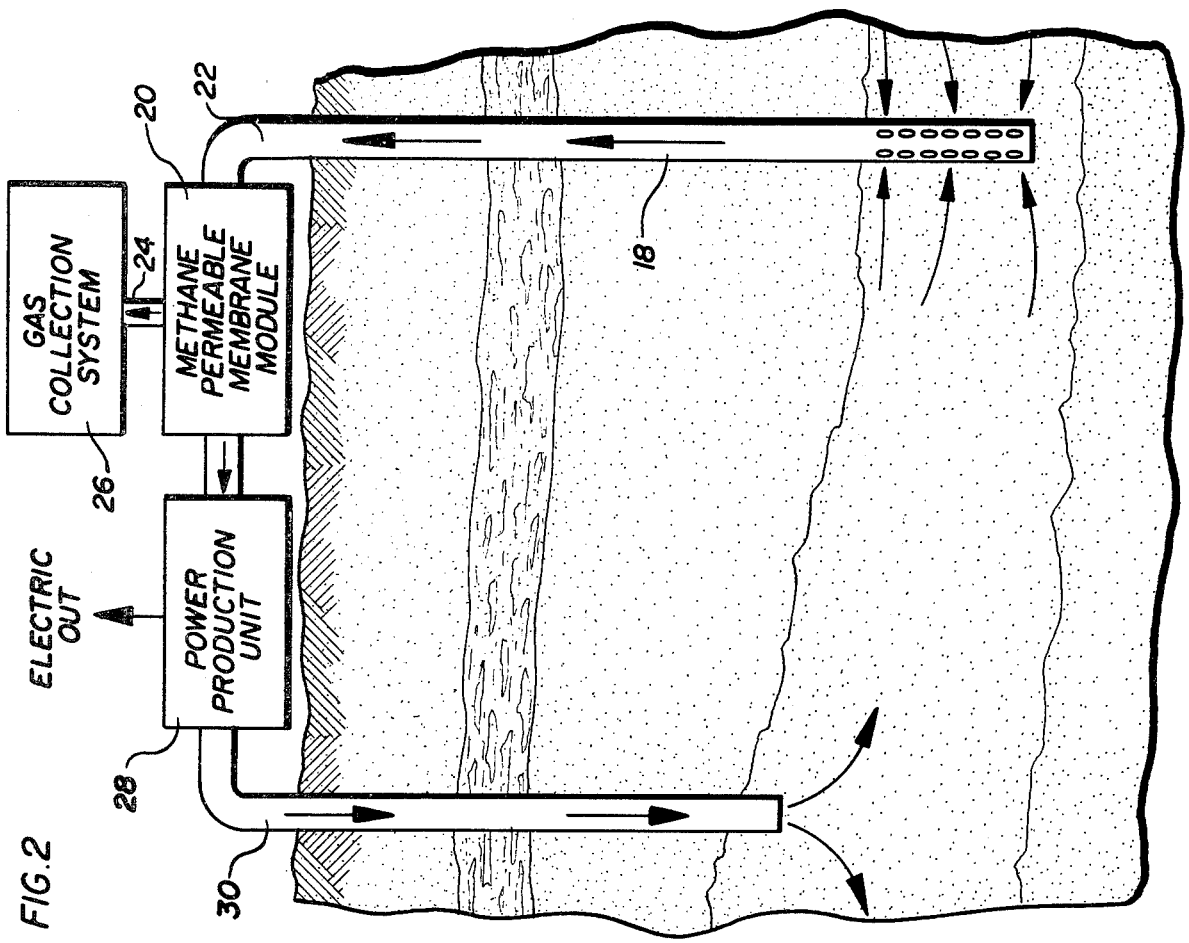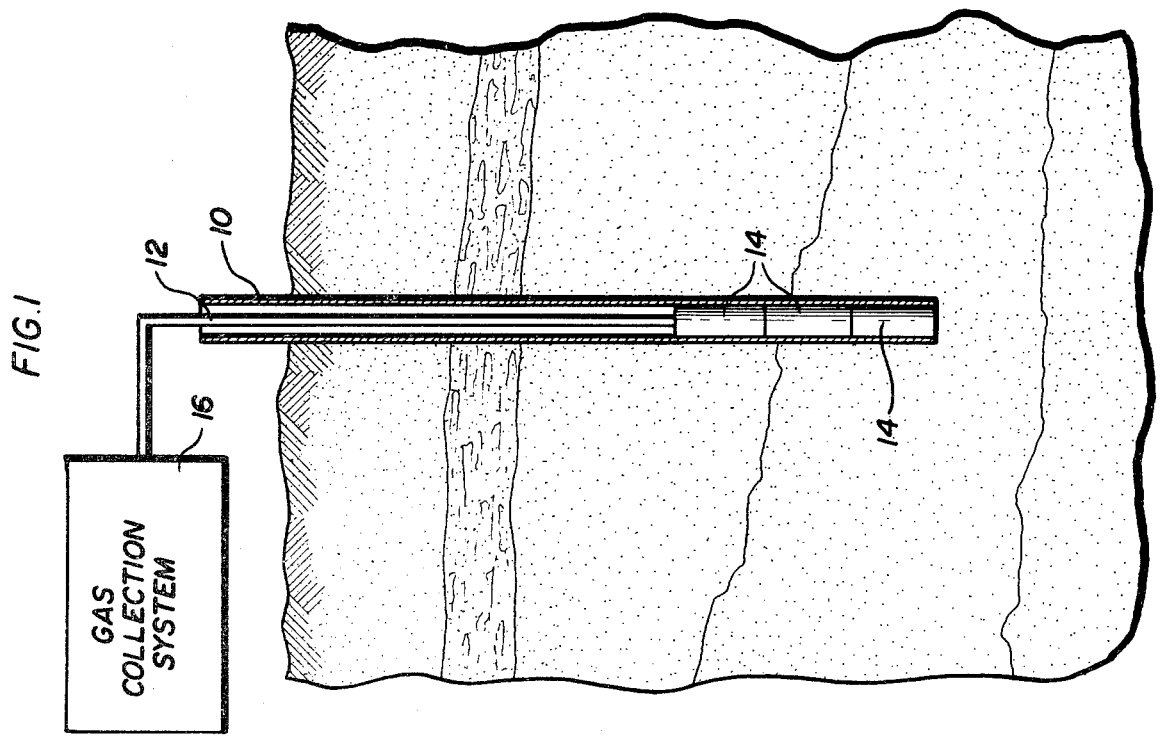

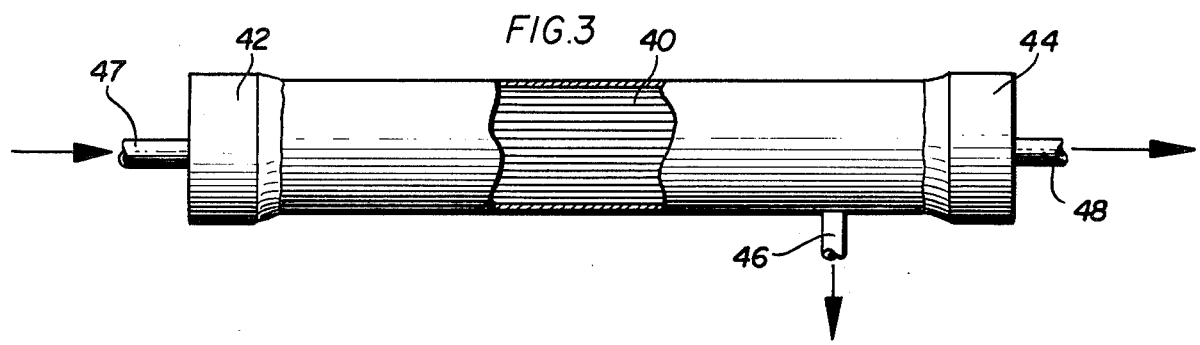
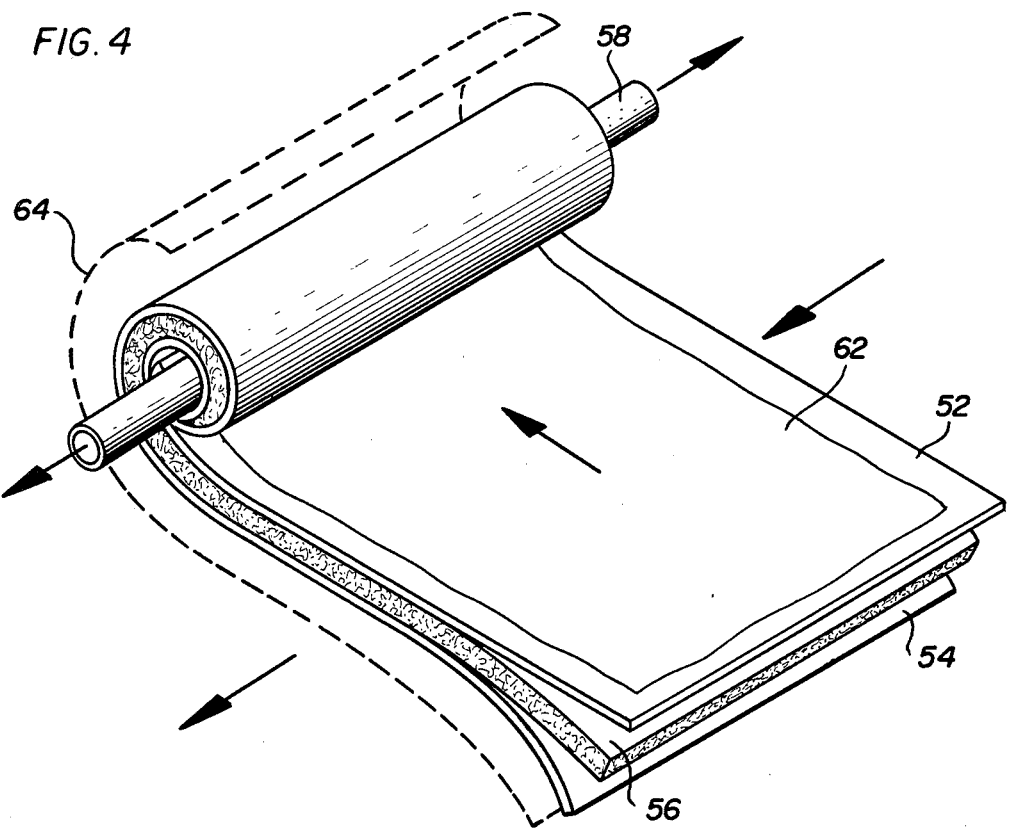
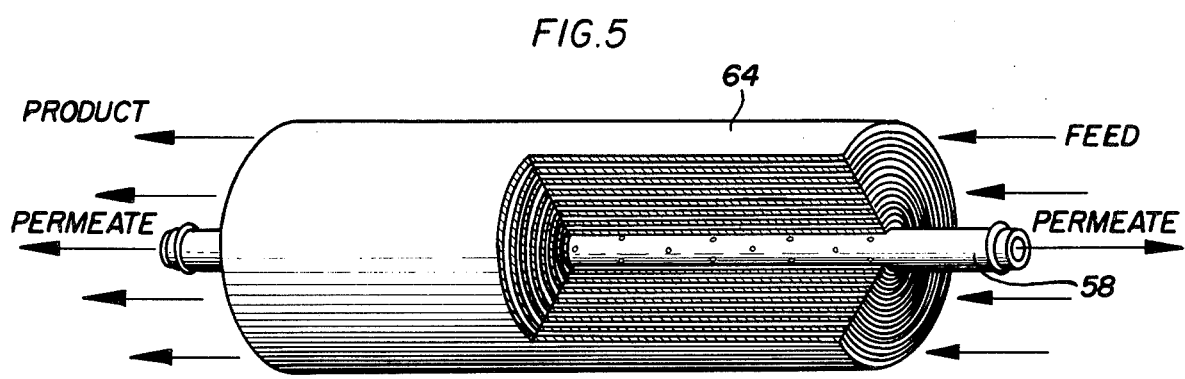

METHOD OF GAS PRODUCTION FROM GEOPRESSURIZED GEOTHERMAL BRINES

This invention relates to a method of recovering methane and other similar fuel components from underground fluid zones that exist naturally at high pressures and, in many cases, at both a high temperature and pressure as found, for example, in various geopressurized geothermal zones.

Recent oil embargoes and subsequent price increases have prompted many in the United States, including many government agencies like the Energy Research and Development Administration, to look for and investigate new or heretofore untapped sources of energy. One such source of considerable interest is the enormous supply of methane, the chief constituent of the natural gas burned in homes and factories, estimated to be found and, in many cases, to be dissolved under pressure in hydro-pressurized zones or reservoirs of water or hot salt water deep within the earth.

For example, such hydro-pressurized zones are found in Louisiana and one such geopressurized geothermal zone underlies the Gulf of Mexico and coastal areas of Texas and Louisiana. It has been estimated that this latter zone alone contains from 24,000 to 105,000 quads of methane. This is a stupendous figure considering the fact that one quad is roughly equivalent to the amount of energy found in a trillion cubic feet of natural gas. At the present time, the United States consumes about 70 quads of energy a year.

Obviously, if this dissolved methane could be economically recovered, this source of energy would be of tremendous value to the United States. The existence of these geopressurized geothermal zones has been known since the 1950's when wildcatters frequently encountered enormous water pressures and observed that natural gas was associated with the vast quantities of hot salt water that gushed out under pressure.

Since then, even though the technology for drilling and completing the wells for tapping these geopressurized geothermal zones, producing the fluid, and separating the natural gas from the water has been developed, no one has ever attempted to withdraw the brine or to separate the methane from it. Several reasons for not having done so exist, among the major ones being the cost for drilling the wells and the environmental problems which exist in extracting the brine. It has been estimated that the cost of each well may be $2 million or more.

Among the various environmental problems, the subsidence problem is the most serious one associated with tapping these zones. It is not presently known what effect withdrawing the large quantities of brine, possibly 40,000 barrels or more per day, will have on the region. Another problem of withdrawing such large quantities of brine from each of the wells is how to dispose of the salt water. As to the latter, it has been proposed to re-inject this salt water back into the zone or, alternatively, to channel it to the sea.

Recently, a new method has been devised for removing or recovering this methane from the brine in these geopressurized geothermal zones, in a fashion which eliminates the above-mentioned, as well as other, environmental problems. In addition, the cost of the wells and/or cost of the fuel is anticipated to be substantially less than present estimates, so that recovery is more economical and practical. The same method can be used to recover the methane found in hydro-pressurized fluid zones wherein the methane is dissolved in the water as a result of the high hydro-static pressures or heads encountered. Accordingly, the term "liquid" as hereinafter used is intended to encompass both the water found in hydro-pressurized zones as well as the brines found in geopressurized geothermal zones.

It is generally well-known that methane and other similar fuel components can be separated from other gaseous components by utilizing gas permeable membranes which are selective for that or those fuel components. The technology associated with membrane utilization for purposes of separation of particular fuel components is extensive, but none of this technology has heretofore been directed or utilized to separate methane and other similar fuel components from liquids in underground fluid zones wherein this methane is dissolved under high pressures. Unexpectedly, methane-selective membranes, stable-to-high temperatures, were found to perform as well or better when immersed in liquid brines containing dissolved gases than when in gaseous mixtures.

Accordingly, in accordance with the method of the present invention, methane and other similar fuel components are separated from the water in these hydro-pressurized zones, or from the brine found in these geopressurized geothermal zones, by immersing gas permeable membranes selective for these fuel components into the liquid in these zones, and permitting these fuel components to permeate through the membranes while rejecting the liquid. The permeated fuel components then are collected. By means of this simple expedient, numerous unexpected results are achieved, among which are the fact that these fuel components can be separated and recovered in situ, thus eliminating at least the above-mentioned environmental problems associated with withdrawing large quantities of brine, that of subsidence and disposal of the brine. Further still, by withdrawing and re-injecting the spent brine after the fuel components are separated from it at ground level, additional energy value can be extracted both from the pressure and heat of the brine. In either event, the cost of the fuel components recovered is substantially less than present estimates, and sufficiently economical to make recovery practical, whereas now it is questionable whether it would be practical to recover these fuel components using existing methods and technology.

Accordingly, it is an object of the present invention to provide an improved method of removing methane from underground fluid zones, which eliminates the environmental problems associated with land subsidence on brine withdrawal and disposal, reduces the cost of fuel and optionally eliminates a need for withdrawing large quantities of liquid for surface processing.

The above objectives are accomplished, in accordance with the present invention, by immersing gas permeable membranes selected for the fuel components in the underground fluid zones to separate these components from the liquids. The membranes are suitably supported to withstand high pressure differentials, are chemically resistant to hot brines and are incorporated in the gas production system so that the permeated gas is collected substantially free of contaminants. The membranes can be immersed in the liquids to separate the fuel components from the liquids in situ or, alternatively, the liquids can be withdrawn to the surface where the fuel components are separated with heat recovery, and with the liquid being rejected.

In particular, in the case of recovering these fuel components from the brine in these geopressurized geothermal zones, the methods proposed by the prior art all generally consist of drilling a large number of wells, withdrawing large volumes of brine, stripping in some fashion the methane from the brine at ground level, and then disposing of the spent brines, either with or without heat recovery. None of these prior methods discloses or permits gas separation from the brines in situ to eliminate disposal and environmental problems, to yield a relatively pure gas, nor do they disclose stripping the gas from the brine at ground level using gas permeable membranes, as taught by the present invention.

The method of the present invention, therefore, comprises the steps of incorporating one or more gas permeable membranes into a gas collection system; continuously or intermittently subjecting part or all of the membrane permeators to a liquid containing dissolved methane and other similar fuel components; permeating the methane and similar fuel components through the membrane; and collecting the permeated methane and similar fuel components while rejecting the liquid.

The membranes which can be used in the invention are those having methane permeabilities, anisotropic, composite or homogeneous structure; and spirally wound, tubular, or hollow fiber configurations. Suitable chemical structures include polytetrafluorethylene, polyolefins, polypeptides, and other polymers that exhibit good high-temperature performance, low water permeability and high methane permeability.

DESCRIPTION OF THE DRAWINGS

FIG. 1 is a schematic illustration in situ fuel gas production from geopressurized geothermal zones; in accordance with the method of the present invention;

FIG. 2 is a schematic illustration of surface processing of natural brines on the surface to recover methane, in accordance with the method of the present invention;

FIG. 3 is a side plan view generally illustrating a capillary membrane tube support system;

FIG. 4 is a perspective view generally illustrating a sandwich-type construction of a spirally wound membrane; and FIG. 5 is a perspective view, partially cut away, of the assembled membrane of FIG. 4.

DESCRIPTION OF PREFERRED EMBODIMENT

Referring now to the drawings, in FIG. 1 there is generally illustrated the manner in which methane and other similar fuel components can be stripped from the brine, in situ. As there illustrated, a well is drilled in conventional fashion to the depth of the geopressurized zones containing brine with the methane and other fuel components dissolved in it. The well contains the usual well casing 10.

A pipe, 12 including one or more gas permeable membranes 14 which are incorporated into it in spaced relation, extends through the well casing 10, and extends beyond it into the brine so that the membranes 14 are immersed in the brine. The methane and other fuel components permeate through the membranes 14, while the brine is rejected. The methane and other fuel components then flow through the pipe 12, to a suitable gas collection system 16.

In this embodiment of the invention, obviously the brine does not have to be withdrawn, thus the above-mentioned problems of brine disposal and land subsidence both are eliminated. The methane is simply stripped from the brine as it permeates through the membranes 14 and the brine is rejected and remains in situ.

In FIG. 2, there is generally illustrated a method of recovering the methane and other fuel components from the brine above ground. In this case, a well is drilled in conventional fashion, with the well casing 18 extending well into the brine in the geopressurized zone. A module 20 containing one or more gas permeable membranes is incorporated into the piping 22 coupled to the well casing, such that the brine withdrawn from the fuel pressurized zone flows through the module 20 in contact with the membranes therein so that methane and other fuel components are stripped from the brine. This methane and other fuel components flow through the pipeline 24 to the gas collection system 26.

Also, preferably and advantageously, the hot brine is conveyed to and utilized in a power production unit 28 of a type which extracts the heat from the brine and, for example, generates electricity. The spent brine then preferably is reinjected into the geopressurized zone, via a second well 30.

As indicated above, the membranes are those having methane permeabilities; may be anisotropic, composite or homogeneous structures; and may have spirally wound, tubular or hollow fiber configurations. These all are typical configurations which are well-known in the art, and the manner in which the membrane is supported so that it does not collapse under a pressure differential depends on the configuration.

An obvious configuration is a membrane sheet supported by a frame. However, a membrane case in the form of a tube is more practical because the membrane area-to-volume ratio is much higher, and if the membrane is thick enough for the particular pressure differential conditions, it will not collapse. Porous supporting material can be placed within the tube to increase the strength, or the active membrane layer can be cast on a physical support layer having high gas permeability. The anisotropic and composite configurations can be supported by this technique. The very thin capillary tubes often do not need any additional support, and a bundle of tubes can be used as illustrated in FIG. 3.

For example, as can there be seen, a number of the capillary tubes 40 are bundled and potted by means of a resin or the like, into a pair of end caps 42 and 44. An outlet 46 is provided for removing the permeated gas, while the end caps 42 and 44 have pipe stems 47 and 48 for injecting and withdrawing brine. In other words, brine is pumped or otherwise caused to flow through the pipe stem 47, through the bundle of capillary tubes 40, and out through the pipe stem 48. The methane and other fuel components which permeate through the capillary tubes 40 is collected at the outlet 46. Alternatively, the brine can be permitted to pass around the capillary tubes, with the methane permeating through the tubes for collection.

Another membrane assembly is illustrated in FIGS. 4 and 5. In this case, it is of a spirally wound configuration, having two membrane sheets 52 and 54, each of which is slightly shorter than the completed module attached to a backing 56 for permeate collection. The resulting sandwhich is then attached to a core 58 with holes (not shown) that serve as a manifold for the permeated gas. An intersandwich mesh 62 is placed parallel to the sandwich to maintain a space between the layers for the high pressure feed bearing. The mesh and the membrane sandwich are then rolled up, and are then wrapped with a protective plastic sheet 64 which also keeps the assembly tightly wound, as illustrated in FIG. 5. Individual modules or assemblies 50 can be mounted in series in a pipe housing to furnish a complete membrane system.

All of the above support mechanisms are generally known in the art, and thus form no part of the present invention. Various other support membranes can as well be used, and various parallel and series connections in membrane modules, with and without recycle, are also possible. In operation, it is also possible to reduce the pressure on the permeate side of the membrane to increase the pressure differential across the membrane so as to increase the rate of separation. Further still, other operating modes can be, for example, pulsed or steady-state.

The resistance of suitable methane-permeable membranes to hot brines must, of course, exist, at least to the temperatures encountered during use. The temperatures encountered in geothermal brines can be as high as 150° C. and higher, hence the membranes must be able to withstand at least a temperature of 150° C.

If organic membranes are used, the chemical structures should be selected to withstand the in situ temperatures. Some membranes having suitable chemical structures include polytetrafluroethylene, polyolefins, and polypeptides. If resistance to higher temperatures is necessary, it can be incorporated in the usual manner by use of organo-metallic membranes.

In the table below are listed the resistance to water and temperature of several polymeric membrane materials, and any one of these materials may be used for the membranes in accordance with the method of the invention.

TABLE I

| Polymer Resistance to Water and Heat | | |
| --- | --- | --- |
| Polymer Type | Temperature, °F. ASTM Test D759 | Water, ASTM Test E96 |
| Acrylonitrile-butadiene-styrene (ABS) | 190-220 | G |
| Cellulose Acetate | 150-200 | G |
| Cellulose Triacetate | 300-420 | G |
| FEP Fluoroplastic | 440-525 | G |
| Teflon | 500 | G |
| Nylon 6 | 200-400 | G |
| High Density PE | 250 | G |
| Polyimide | 750 | G |
| Polysulfone | 350 | G |
| Polyethorsulfone | 400-450 | G |

Acetal Copolymer, 10% NaCl solution, 180° F. 180 days; +0.5% cut change, slight discoloration
Nylon Zytel 101, 10% NaCl solution, 73° F. 365 days; no change observed.

As indicated above, the method of the present invention permits methane and other similar fuel components to be removed from underground brine such as found in many geopressurized geothermal zones. The method furthermore eliminates the environmental problems associated with land subsidence on brine withdrawal and disposal. Broadly, the method includes the steps of incorporating a gas permeable membrane to a gas collection system, continuously or intermittently subjecting part or all of the membrane permeator to the liquid brine containing dissolved and other fuel components, permeating the fuels through the membrane, and collecting the permeated methane and other fuel components while rejecting the brine. The method may be used to recover the methane from the brine in situ, or at ground level. Also, while the described embodiment of the invention is specific to the removal of methane from the brine found in geopressurized geothermal zones, the same method can be used to remove the methane dissolved in the water found in hydro-pressurized zones. In the latter case, the temperatures encountered usually are substantially lower. The pressures encountered likewise may be substantially lower.

Now that the invention has been described, what is claimed as new and desired to be secured by Letters Patent is:

1. A method for separating and recovering methane and other similar fuel components from the liquids in underground fluid zones that exist naturally at high pressures comprising the steps of:
    (a) incorporating a gas permeable membrane selective for the methane and other similar fuel components into a gas collection system;
    (b) subjecting said membrane to the liquid containing the methane and other similar fuel components;
    (c) permeating the methane and other similar fuel components through said membrane; and
    (d) collecting the permeated methane and other similar fuel components while rejecting the liquid.

2. The method of claim 1, wherein said gas permeable membranes are immersed in the liquid in situ to recover the methane and other similar fuel components.

3. The method of claim 2, wherein said gas permeable membranes are supported to withstand high pressure differentials.

4. The method of claim 1, further comprising the steps of:
    (e) removing the liquid from the undergound fluid zone to ground level;
    (f) subjecting said membrane to the liquid at ground level to remove the methane and other similar fuel components;
    (g) collecting the permeated methane and other similar fuel components while rejecting the liquid; and
    (h) reinjecting the spent liquid into the underground fluid zone.

5. The method of claim 1, wherein said membranes are anisotropic membranes.

6. The method of claim 1, wherein said membranes are composite membranes.

7. The method of claim 1, wherein said membranes are homogeneous membranes.

8. A method for separating and recovering methane and other similar fuel components from geopressurized geothermal brines that exist naturally at high temperatures and pressures comprising the steps of:
    (a) incorporating a gas permeable membrane selective for the methane and other similar fuel components into a gas collection system;
    (b) subjecting said membrane to the brine containing the methane and other similar fuel components;
    (c) permeating the methane and other similar fuel components through said membrane; and
    (d) collecting the permeated methane and other similar fuel components while rejecting the brine.

9. The method of claim 5, further comprising the steps of:
    (e) removing the brine from the geopressurized geothermal zone to ground level;

(f) subjecting said membrane to the brine at ground level to remove the methane and other similar fuel components;

(g) collecting the permeated methane and other similar fuel components while rejecting the brine; and (h) reinjecting the spent brine into the geopressurized geothermal zone.

10. The method of claim 9 further comprising the step of utilizing the heat of the brine to produce energy.

11. A method for separating and recovering methane and other similar fuel components from geopressurized geothermal brines that exist naturally at high temperatures and pressures comprising the steps of:

(a) incorporating a gas permeable membrane selective for the methane and other similar fuel components into a gas collection system;

(b) immersing said membrane in situ in the brine containing the methane and other similar fuel components;

(c) permeating the methane and other similar fuel components through said membrane; and (d) collecting the permeated methane and other similar fuel components while rejecting the brine.

12. The method of claim 11, wherein said gas permeable membranes are supported to withstand high pressure differentials and are chemically resistant to hot brines.

13. The method of claim 11, wherein said gas permeable membranes are resistant to temperatures at least as high as 150° C.

* * * * *